US012069074B2

(12) United States Patent
Amidon et al.

(10) Patent No.: US 12,069,074 B2
(45) Date of Patent: Aug. 20, 2024

(54) THREAT REPRESENTATION AND AUTOMATED TRACKING AND ANALYSIS

(71) Applicant: Arista Networks, Inc., Santa Clara, CA (US)

(72) Inventors: Keith Amidon, Los Altos, CA (US); David Pearson, Fairport, NY (US); Jeff Polakow, San Mateo, CA (US); Matthew Park, Denver, CO (US); Gary Golomb, Los Gatos, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 600 days.

(21) Appl. No.: 17/342,785

(22) Filed: Jun. 9, 2021

(65) Prior Publication Data

US 2022/0400126 A1 Dec. 15, 2022

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ............ H04L 63/1416; H04L 63/1425; H04L 63/1433; H04L 63/1441
See application file for complete search history.

(56) References Cited

U.S. PATENT DOCUMENTS

| | | | |
|---|---|---|---|
| 11,729,204 B1* | 8/2023 | Coull | H04L 63/1416 726/25 |
| 2017/0063917 A1* | 3/2017 | Chesla | H04L 63/20 |
| 2018/0324212 A1* | 11/2018 | Yan | H04L 63/1433 |
| 2022/0303301 A1* | 9/2022 | Hubbard | H04L 63/1441 |

\* cited by examiner

*Primary Examiner* — Minh Dinh
(74) *Attorney, Agent, or Firm* — Fountainhead Law Group, PC (57) ABSTRACT

An automated framework provides security monitoring and analysis in a network by autonomously detecting actual and potential threats to the network. In response to detection of a threat, the framework instantiates a Situation to provide directed monitoring of the threat. The Situation invokes specific skills based on the state of the Situation to monitor network traffic for activity specific to the threat that instantiated the Situation. As data is collected, additional skills may be invoked based on the additional data to collect new data, and previously invoked skills may be terminated depending on the additional data to avoid collecting information that is no-longer relevant.

20 Claims, 7 Drawing Sheets

THREAT REPRESENTATION AND AUTOMATED TRACKING AND ANALYSIS

CROSS REFERENCE TO RELATED APPLICATIONS

This application is related to the following commonly owned U.S. Applications, the content of which are incorporated herein by reference in their entireties for all purposes:

U.S. application Ser. No. 15/042,127, filed Feb. 11, 2016, now U.S. Pat. No. 10,237,287
U.S. application Ser. No. 15/042,135, filed Feb. 11, 2016, now U.S. Pat. No. 10,218,717
U.S. application Ser. No. 15/136,862, filed Apr. 22, 2016, now U.S. Pat. No. 10,362,062
U.S. application Ser. No. 15/136,865, filed Apr. 22, 2016, now U.S. Pat. No. 10,142,359
U.S. application Ser. No. 15/136,870, filed Apr. 22, 2016, now U.S. Pat. No. 9,992,209
U.S. application Ser. No. 15/619,513, filed Jun. 11, 2017, now U.S. Pat. No. 10,218,733

BACKGROUND

Security analysis is a critical component of any company or organization with assets (whether digital, physical, or both) that must be protected. The current state of the art is to have one or more security products that provide the security analyst with information (e.g., alerts) about events in the environment which may have relevance to the security of their assets. These products provide varying levels and types of alerts, though most have highly-specific alerts and do not provide higher-level context. Tools that have more contextually-rich alerts provide context only around a small number (often, one) of events that are linked together in an environment. The security analyst typically spends most of their time attempting to piece together the disparate pieces of information from these systems and validate them by cross-checking them with each other and with other sources of information available to the analyst. The effort is repetitive, time-consuming, and error-prone because of the scope of information to be covered and the ability of adversaries to rapidly change their tactics.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure describes a security platform that provides a modular and extensible framework that allows any of the above-mentioned alerts to be contextualized for a given environment in an automated manner. Such a framework is beneficial because it allows for arbitrary creation of automated "skills" that the framework can decide whether or not to run based on any analysis that has already been performed as well as new information becoming available. This reduces the amount of work that is performed on activity that has been identified as uninteresting (a "False Positive") while using more resources to further contextualize behavior that is interesting (a "True Positive"). The independence and flexibility of the framework allows the automation to make these decisions much like an experienced human analyst would, thereby freeing the human analyst to focus more on undiscovered threats and preventative measures.

The framework operates on a tracking data object, called a Situation, to track data that has been associated with the threat in the course of both automated and human manual analysis. For each piece of data the Situation records, the role of the data in the attack, the confidence in the assignment of that role, and the reason for that assignment. This information constitutes the data that the automation framework uses to select further skills (analysis and monitoring) to be performed as well as to record the results of that analysis in a form a human analyst can easily understand.

A security knowledge graph provides a source of knowledge of the network being monitored. The security knowledge graph evolves as information about the network flows into the security platform.

In the following description, for purposes of explanation, numerous examples and specific details are set forth in order to provide a thorough understanding of embodiments of the present disclosure. Particular embodiments as expressed in the claims that follow this description may include some or all of the features in these examples, alone or in combination with other features described below, and may further include modifications and equivalents of the features and concepts described herein.

Figure 1:
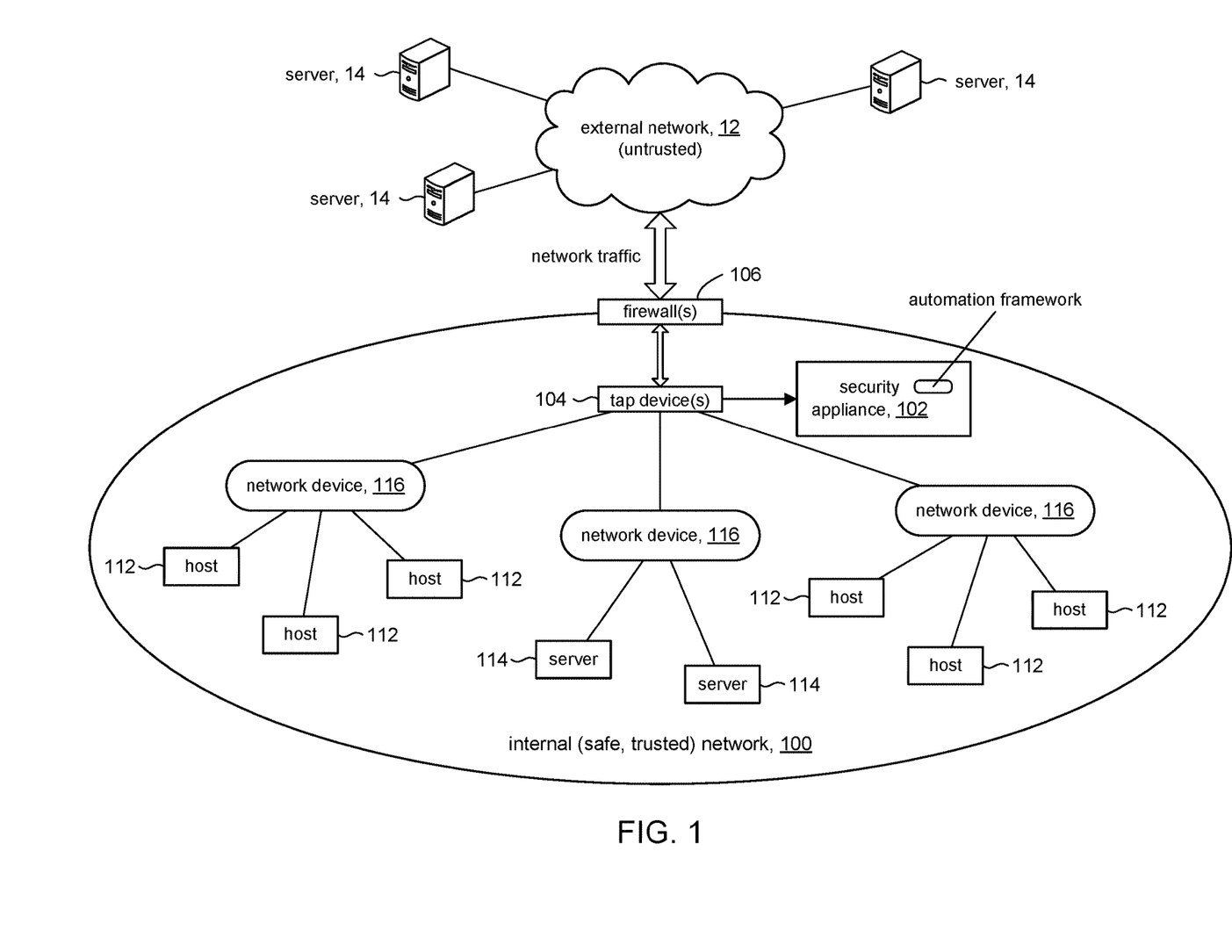
FIG. 1 is high level block diagram of security for a network in accordance with the present disclosure.

FIG. 1 shows a high-level block diagram of a networked environment that includes a security appliance in accordance with the present disclosure. In some embodiments, for example, network 100 can be a trusted network in an organization that includes security appliance 102. Network 100 can include computing devices, such as hosts 112, servers 114, and the like, and network devices 116, such as switches, routers, wireless access points, etc. Network 100 can comprise a local area network and a wide area network, including virtual networking, that interconnects the various computing devices.

Network 100 can include one or more firewalls 106 to provide hosts 112 and servers 114 with access to one or more external (untrusted) networks 12, such as the Internet, to reach external servers 14 which represent potential bad actors. In accordance with some embodiments, each firewall 106 can be associated with a network tap device 104. Network devices 116 (and in some instances hosts 112 and/or servers 114) can connect to network tap devices 104 associated with respective firewalls 106 to mirror or otherwise replicate network traffic that flows into and out of network 100 to security appliance 102; e.g., packets between hosts 112 and external servers 14. Although not shown in the figure, network tap devices can be located within network 100, not just at the edge. Locating network taps within the network allows traffic among hosts 112 and servers 114 to be mirrored to security appliance 102. In some embodiments, network tap functionality can be incorporated into devices comprising network 100, such as routers and switches, to mirror traffic flowing through those devices to security appliance 102.

Aspects of security appliance 102 are described, for example, in commonly owned U.S. Pat. No. 10,218,717, which is incorporated herein by reference. Briefly, security appliance 102 can be configured to monitor potential threats to network 100, evaluate identified potential threats, issue alerts, and initiate/recommend corrective action as needed. In accordance with the present disclosure, security appliance 102 can include an automation framework (FIGS. 2, 5) to autonomously manage threat situations in accordance with the present disclosure. The discussion will now turn to a description of an automation framework in accordance with some embodiments.

Figure 2:
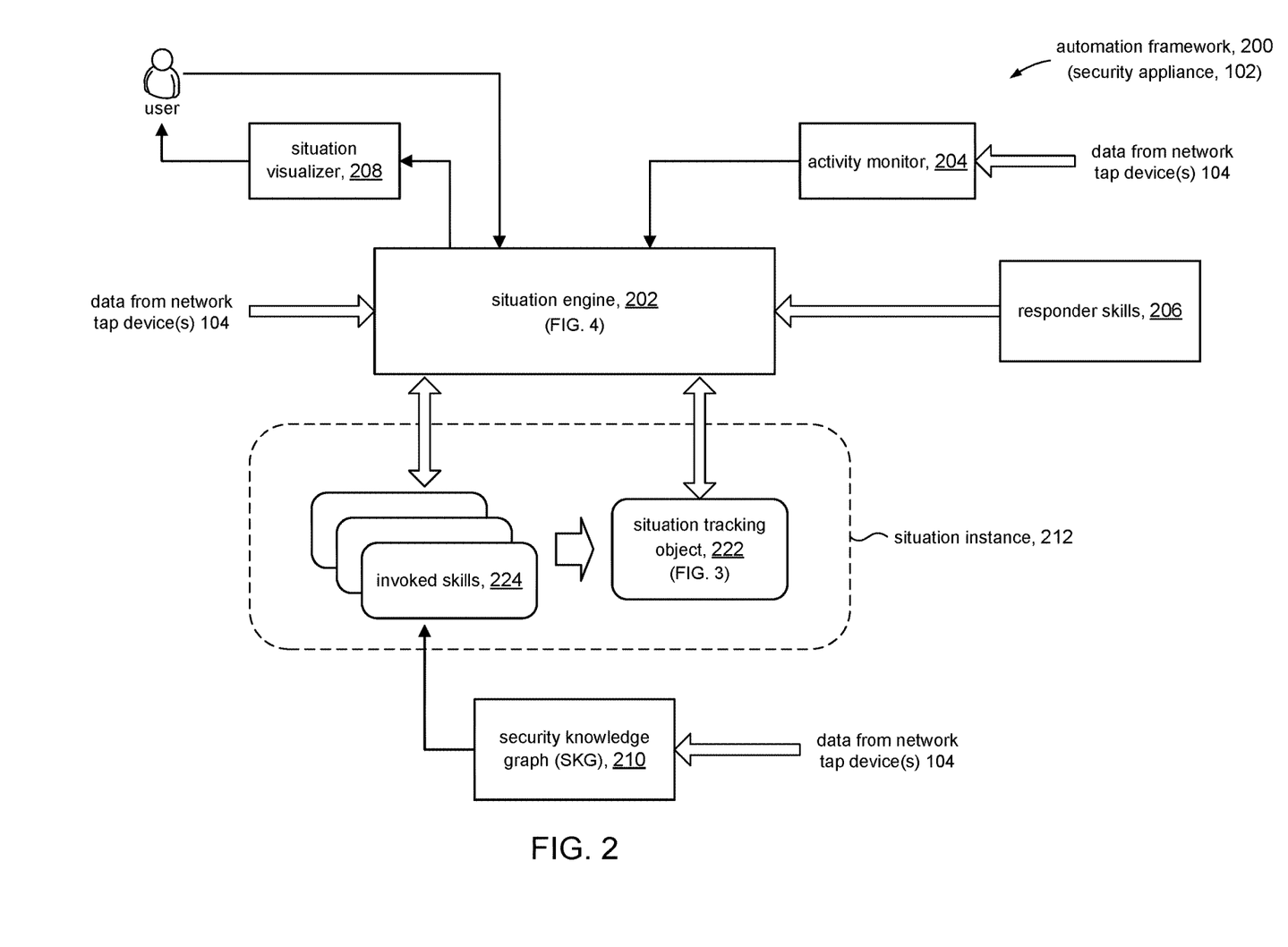
FIG. 2 is a high level block diagram of an automation framework in accordance with some embodiments of the present disclosure.

Referring to FIG. 2, a high level logical block diagram shows functional components of automation framework 200 in accordance with some embodiments. As used herein, a threat situation (or more simply a "Situation") refers to activity in network 100 that merits further attention. The monitored activity may represent an actual threat, a perceived threat, a suspected threat, and so on. The various degrees of threats will be collectively referred to herein simply as a "threat."

In accordance with the present disclosure, automation framework 200 can include a situation engine 202 to drive a Situation through its various states; e.g., from instantiation of the Situation, to investigation of the Situation, to reviewing the Situation, and to remediation and closing out of the Situation. A Situation can be instantiated by a user such as a network administrator, threat analyst, and the like.

In accordance with the present disclosure, a Situation can be automatically instantiated absent input from a user. In some embodiments, for example, automation framework 200 can include activity monitor 204 to monitor traffic flow (packets) and events in network 100 to detect a threat. Events include activity that can be derived from the network data such as the first time a device or domain was observed communicating on the network, model matches that have occurred for a device, indicator of compromise (IOC) matches that have occurred for a device, etc. The activity monitor can comprise one or more background processes that monitor network activity, and based on the monitored information, the activity monitor can autonomously trigger situation engine 202 to instantiate a Situation (e.g., 212) to track suspect activity. In some embodiments, for example, activity monitor 204 can monitor traffic flow information collected by network tap devices 104.

Automation framework 200 can further include a set of responder skills 206 that can be invoked by situation engine 202. Responder skills 206 (or simply "skills") can monitor activity in network 100 and provide telemetry to develop an instantiated Situation. Activity that can be monitored includes network traffic among the nodes comprising network 100, such as computing devices, network devices, firewalls, etc. For example, a skill can be programmed or otherwise configured to look for specific packets based on source of the packet (e.g., using the source IP address or a source MAC address), the destination of the packet, and so on. Responder skills can monitor data in the network, for example data in security knowledge graph 210, and update instantiated Situations with information about the network.

Automation framework 200 can further include situation visualizer 208 to provide a user with various views of an instantiated Situation. In some embodiments, for example, visualizer 208 can generate an attack sequence, which represents the progress of a Situation in terms of a sequence of messages and events associated with the Situation. Visualizer 208 can generate an attack map, which represents a visual representation of interconnected pieces of a threat to the environment, based on the relationships among security knowledge graph entities relevant to the threat documented in the Situation. It will include objects such as devices, domains, IP addresses, documentation, and users.

In some embodiments, security appliance 102 can include security knowledge graph 210. The security knowledge graph can associate any information that flows into security appliance 102 with nodes in network 100 that have relationships with other nodes in the network. Aspects of SKG 210 are described, for example, in commonly owned U.S. Pat. No. 10,218,717. Briefly, network traffic (packets) mirrored by tap device(s) 104 and provided to security appliance 102 can be analyzed to identify entities (e.g., hosts 112, servers 114, etc.) comprising network 100, usernames, domains, etc. The identified information can be used to build security knowledge graph 210, and as the network traffic continues to be monitored by the network tap devices, the data associated with those entities continue to evolve in the security knowledge graph. Situation engine 102 and invoked skills 224 can access the data collected by security knowledge graph 210 to inform the analysis and decisioning making process for a Situation being monitored. This separation of functionality allows the security knowledge graph to develop a representation of the environment in which security threats evolve without having to take into consideration the specifics of a given threat, and at the same time allows the situation engine to focus on the specifics of each threat being analyzed.

Situation engine 202 can invoke a situation instance to monitor threats that are (1) manually identified by a user or (2) automatically identified by activity monitor 204. As shown in FIG. 2, in some embodiments, situation instance 212 can comprise situation tracking object 222 and invoked skills 224. Situation tracking object 222 represents a Situation, and in some embodiments can be a data object that contains information (described below) for tracking and managing the evolution of the Situation as data about the Situation is collected. For a given situation instance, the situation engine can identify and invoke one more skills 224 from the pool of responder skills 206 to collect data used to track and manage the Situation. The collected data can be used to update data comprising situation tracking object 222.

Although FIG. 2 shows one situation instance, it will be appreciated that in general situation engine 202 can instantiate multiple situation instances and manage and track multiple Situations. Each Situation will have a corresponding situation instance. Each situation instance will have its own situation tracking object and will be associated with a corresponding set of invoked skills specific to the Situation.

Figure 3:
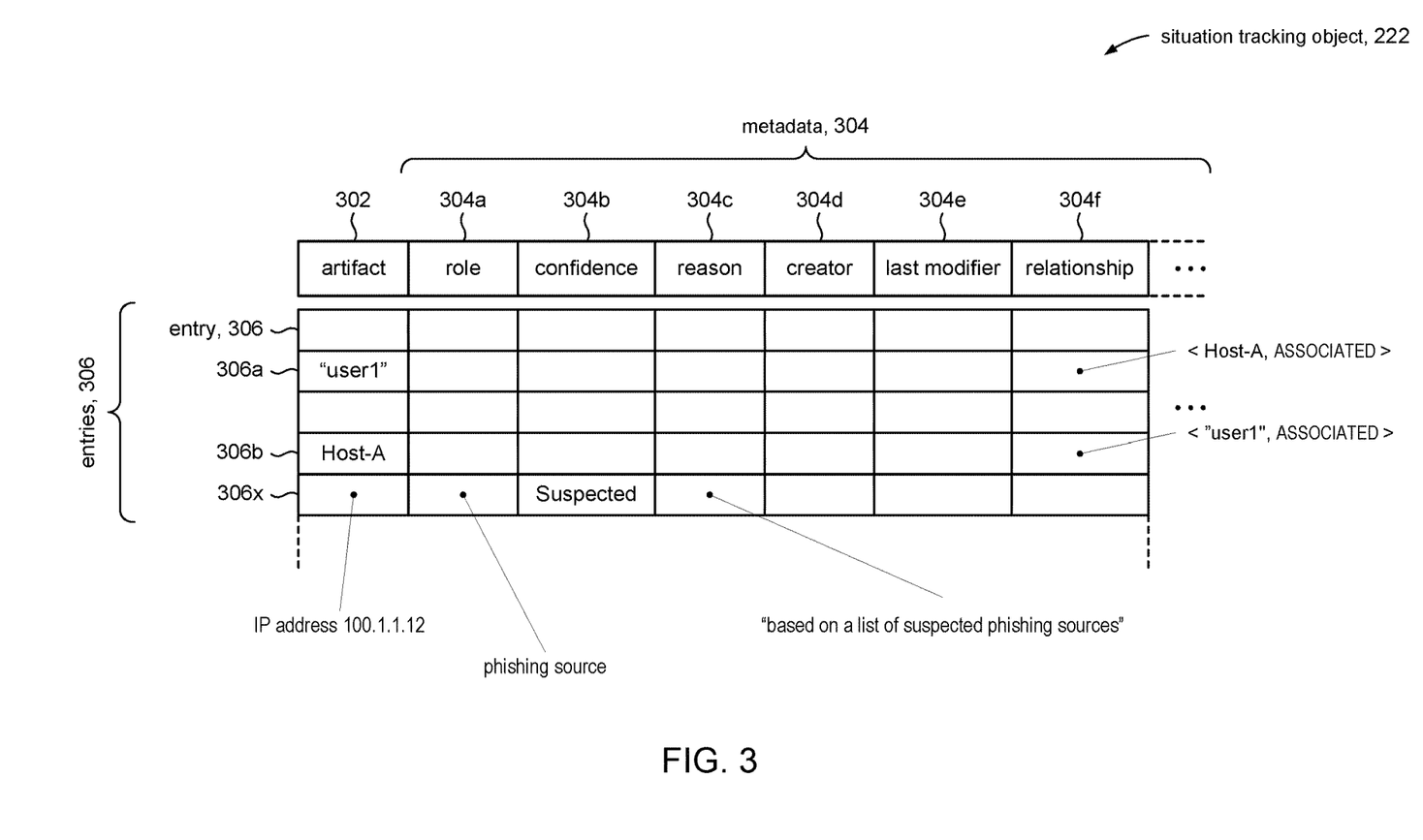
FIG. 3 is a representation of a situation tracking object in accordance with some embodiments of the present disclosure.

The discussion will now turn to a description of situation tracking object 222 in accordance with the present disclosure. The situation tracking object can serve to document the information collected for a Situation to develop an understanding of the Situation. Data stored in the situation tracking object can serve as pivot points to additional information vis-à-vis security knowledge graph 210 to facilitate automated hunting by skill or manual hunting by users to further develop an understanding of the Situation. The current values of the data contained in the situation tracking object represent a current threat state of the threat that is being tracked.

FIG. 3 shows an example of situation tracking object 222 in accordance with some embodiments. The situation tracking object can be organized as a table of data entries 306, where each entry comprises an artifact data field 302 and corresponding metadata data fields 304.

Entity and Artifact Overview

In accordance with the present disclosure, situation tracking object 222 can include entities and artifacts. Artifacts are the objects that are involved in a Situation. Artifacts can be physical things (e.g., computing devices, network devices, etc.) or logical elements (e.g., IP address, actions, etc.). In some embodiments, artifacts can be divided into three types or categories:

object artifacts—these artifacts represent things (host machines, servers, etc.) that take action or are acted upon, action artifacts—these artifacts represent actions taken by a person or by software, informational/documentation artifacts—these artifacts represent additional information related to the Situation, e.g., information about an associated object or action artifact, to provide context about the Situation being monitored.

In some embodiments, object artifacts can be referred to as entities in that they that they represent things that are taking action or being acted upon. The distinction between an object artifact and an entity is the level of abstraction from the concrete hardware/software representation. For example, an IP address can be referred to as an object artifact because it is a number used as an identifier by hardware/software. A device, on the other hand, can be referred to as an entity because it represents a real-world concept that we infer from the IP address and other artifacts it produces as it goes about its business. Other than this level of abstraction distinction, entities and object artifacts can be treated the same.

In some embodiments, object artifacts include, but are not limited to:
 device
 directory name server (DNS) domain name
 username
 IP address
 a threat-specific generic (custom) object In some embodiments, action artifacts include, but are not limited to:
 activity—this artifact refers to a communication between artifacts, for example, device and domain, device and device, an IP address and device, an IP address and another IP address, and so on.

threat behavior—this artifact refers to a collection of communications between one or more initiators and targets, such as device and domain, device and device, an IP address and device, an IP address and another IP address, and so on.

query artifact—this selects a set of activities based on conditions on the attributes of that activity. Responder skills can use these to capture new information in the Situation.

In some embodiments, informational/documentation artifacts include, but are not limited to:
 artifact analysis—this artifact represents some kind of analysis of an artifact in the Situation, for example, an open source intelligence (OS-INT) analysis of the artifact, a screenshot of a phishing destination website, and the like,
 vulnerability documentation—this artifact represents documentation about a vulnerability, for example, a link to a Common Vulnerabilities and Exposures (CVE) description,
 attack documentation—this artifact represents information about an attack procedure, for example, a threat report,
 technical documentation—this artifact represents information about a technical subject related to the Situation, for example, a protocol specification,
 activity sample—this artifact represents a sample of activity related to the Situation, for example, a packet capture (PCAP) of threat behavior or activity information that was part of the Situation,
 malware sample—this artifact represents a malware sample related to the Situation, for example, a malware executable.

In some embodiments, artifacts 302 (e.g., devices, usernames, domains, etc.) that can be added to the Situation can be recorded in the situation tracking object as references to the artifact's record in security knowledge graph (SKG) 210. The data associated with artifacts in the SKG continue to evolve independently of Situations being monitored. Situation engine 202 can make use of that data as responder skills are invoked by following the references from the situation tracking object to the SKG. This separation of functionality allows the SKG implementation to focus on accurately describing the environment in which security threats evolve without having to take into consideration the specifics of a given threat. The situation engine is then free to focus on the specifics of each kind of threat being analyzed.

Adding Entities and Artifacts to the Situation Tracking Object

Artifacts 302 can be added to situation tracking object 222 by invoked skills 224 in automated fashion as they monitor network traffic and events occurring in network 100. Users can manually add data to the situation tracking object as well. Each entry 306 in the situation tracking object represents an artifact. Each artifact can have associated metadata 304 to provide additional context for the artifact. The metadata can be added at the time the artifact is added, or subsequent to when the artifact is added. An illustrative list of metadata 304 for a given artifact in a given entry includes, but is not limited to:

Role, 304*a*—This represents a list of one or more roles the artifact plays in the Situation, describing how the artifact is involved in the Situation. Roles can be selected from a controlled vocabulary that is specific to the artifact categories. Referring to entry 306*x* in FIG. 3, for example, suppose we have an artifact "IP address 100.1.1.12" (an object artifact). The role for this IP address might be "PHISHING SOURCE." Additional roles (role values) are described below.

Confidence, 304b—This can be any suitable numeric score. Merely to illustrate this point, we can use a score range of 0-100 to express the confidence that this artifact actually played the role(s) assigned. Each role can be associated with a confidence. In interactions with the user we may present and collect this information using categorical values. In some embodiments, for example, the following categories can be used: UNKNOWN=0, POSSIBLE=1-25, SUSPECTED=26-70, CONFIRMED=71-99, CONFIRMED=100. Referring to the example entry 306x in FIG. 3, the confidence category SUSPECTED can be taken to mean that there is a "medium" confidence level that IP address 100.1.1.12 is a phishing source.

In other embodiments, roles can be assigned to one of three levels: POSSIBLE, SUSPECTED, and CONFIRMED. For example, the POSSIBLE confidence level represents the lowest confidence and simply conveys that it is possible that a particular artifact had that Role in the Situation, though we are not at all sure about it. The SUSPECTED confidence level represents a medium confidence to indicate that there is a suspicion that the artifact had that Role in the Situation, although there is no definitive evidence. The CONFIRMED confidence level represents the highest confidence and can be used when it is certain that the Artifact had some Role within the Situation.

Reason, 304c—This can be arbitrary text explaining why the artifact has the role(s) assigned. This metadata can be used to document the reason for selecting a role (or roles) for an artifact and the confidence categories assigned to those roles. For the confidence, the fact that this artifact existed does mean that there is in fact behavior indicative of some particular role (such as phishing, in the case of "Possible Phishing"). Referring to the example entry 306x, for instance, a reason statement can be added manually by a user, or autonomously by an invoked skill.

Creator, 304d—This can identify the creator of the entry in the situation tracking object for the artifact. The creator can be a user or an invoked skill. To reduce clutter, the creator information is not shown in example entry 306x. Although not shown, the situation tracking object can include a creation time data field that represents when the entry was added to the situation tracking object.

Last Modifier, 304e—This can identify the user or skill (and modification time) that last modified the entry. To reduce clutter, the last modifier information is not shown in example entry 306x. Although not shown, the situation tracking object can include a modification time data field that represents when the entry was modified.

Relationships, 304f—Relationships represent the ways that two or more artifacts in a Situation are connected. A relationship can be expressed as a list of one or more artifact-relationship pairs. Each pair indicates a relation between the given artifact and another artifact. Merely to illustrate, two types of relationships will be described with the understanding that other relationships can be defined.

The Action Participant relationship describes the relationship between two or more objects and an action. The relationship is directional, and the objects that are related to the action are: ACTION INITIATOR and ACTION TARGET. An ACTION INITIATOR is an object artifact that acts as the source of an action artifact, and an ACTION TARGET is an object artifact that is the recipient of the action artifact. The initiator to target relation can involve any object artifact; for example, device to domain, device to IP address, device to device, external IP to internal IP (within secure network 100).

The Associated Data relationship describes the relationship between two object artifacts. This relationship is also directional; the two objects are ORIGINAL DATA and ASSOCIATED DATA. The ORIGINAL DATA refers to the object artifact that exists within the Situation. Other object artifacts in the Situation become associated with it. The ASSOCIATED DATA refers to another object artifact that was added to a Situation and associated with the ORIGINAL DATA.

Consider entries 306a and 306b in FIG. 3, for example. In order to represent that the primary username "user1" is associated with a device "Host-A", entry 306a is added to the situation tracking object to represent the username artifact and entry 306b is added to represent the device artifact. The artifact relation field 304f in entry 306a contains the artifact-relationship pair:

<Host-A, ASSOCIATED> to indicate that the username "user1" is associated with Host-A. Conversely, relationship field 304f in entry 306b contains the artifact-relationship pair:

<user1, ASSOCIATED> to indicate that the device Host-A is associated with "user1."

Role Values

In accordance with aspects of the present disclosure, artifacts are assigned to or otherwise associated with roles. As the name suggests, the "role" of an artifact in a Situation represents its purpose or participation (involvement) in the Situation. The role or roles assigned to artifacts in a Situation influence the selection and termination of responder skills. Roles influence risk score calculation. Roles influence the selection and placement of those artifacts in the attack sequence and attack map. Following are illustrative roles (referred to as "role values") for artifacts in a Situation. In some embodiments, for example, role values for entities and object artifacts include, but are not limited to:

UNRELATED—This role value indicates that the artifact is actually not related to the Situation. This role value can be used when an artifact has been added to the Situation but it is determined that was an error. In some embodiments, artifacts are not allowed to be deleted from a Situation so that we can record, in Reason metadata 304c, the result of the investigation that concluded the artifact was unrelated because the work was done to come to this conclusion. It is also possible that the confidence in the role assignment is low which could still affect situation scoring, etc.

UNKNOWN—This role value indicates that the role of the artifact is unknown. This role may be used, for example, by an analyst who in the beginning stages of hunting may add artifacts to the situation tracking object without knowing their roles if any in the threat; this role value can serve as a default value.

LEGITIMATE CLIENT—This role value indicates the artifact represents a client participating in legitimate activity relevant to the Situation.

LEGITIMATE SERVER—This role value indicates the artifact represents a server is participating in legitimate activity relevant to the Situation.

VICTIM—This role indicates an artifact was compromised in the course of the attack.

PATIENT ZERO—This role refers to the initial victim artifact from which the attach spread.

SCANNER—This indicates an artifact that served as a source of scanning.

PHISHING SOURCE—This indicates an artifact that served as a source of phishing content. Typically this would be a legitimate email server.

EXPLOIT SOURCE—An artifact that served as the source of exploit/compromise.

UNWANTED SOFTWARE SOURCE—An artifact that served as a source of unwanted software (e.g. PUPs, etc.).

COMMAND AND CONTROL (C2) SOURCE—An artifact that served as a C2 control node.

EXFILTRATION DROP—An artifact that served as a destination for exfiltrated data.

EXTERNAL ATTACKER—An artifact that served as the source of an attack from outside the perimeter.

CONDUIT—An artifact that served as a conduit for the attacker as he or she traversed the organization.

In some embodiments, role values for action artifacts include, but are not limited to:

UNRELATED—same as for entities & object artifacts

UNKNOWN—same as for entities & object artifacts

ACCEPTABLE USE—This refers to an action that represents acceptable use according to some controlling policy; e.g., company policy. This role value is likely to be used in combination with other roles. For example, the ACCEPTABLE USE role might be used along with PHISHING (below) to label email access activity that would be fine except that it delivered a message that successfully Phished the user.

RECONNAISSANCE—This refers to an action that represents reconnaissance activity.

PHISHING—This refers to an action that represents phishing activity.

EXPLOIT—This refers to an action that represents exploit activity.

DOWNLOAD—This refers to an action that represents the retrieval of data whose maliciousness has not yet been determined.

INITIAL ACCESS—This refers to an action that represents the initial exploit of an attack (similar to the distinction between the VICTIM and PATIENT ZERO roles).

COMMAND AND CONTROL—This refers to an action that represents command and control activity.

DATA ACCESS—This refers to an action that represents remote data access activity.

LATERAL MOVEMENT—This refers to an action that represents lateral movement.

REMOTE EXECUTION—This refers to an action that represents remote execution.

EXFILTRATION—This refers to an action that represents exfiltration activity.

In some embodiments, role values for informational artifacts include, but are not limited to:

UNRELATED—same as for entities & object artifacts

UNKNOWN—same as for entities & object artifacts

ARTIFACT ANALYSIS—This refers to some kind of analysis of an artifact in the Situation; for example, an OS-INT analysis of the artifact, or a screenshot of a phishing destination website, and the like.

VULNERABILITY DOCUMENTATION—This refers to documentation about a vulnerability, for example, a link to a CVE description.

ATTACK DOCUMENTATION—This refers to information about an attack procedure, for example a threat report.

TECHNICAL DOCUMENTATION—This refers to information about a technical subject related to the Situation, for example, a protocol specification.

ACTIVITY SAMPLE—This refers to a sample of activity related to the Situation, for example, a PCAP of threat behavior or activity information that was part of the Situation.

MALWARE SAMPLE—This refers to a malware sample related to the Situation, for example, a malware executable.

Figure 4:
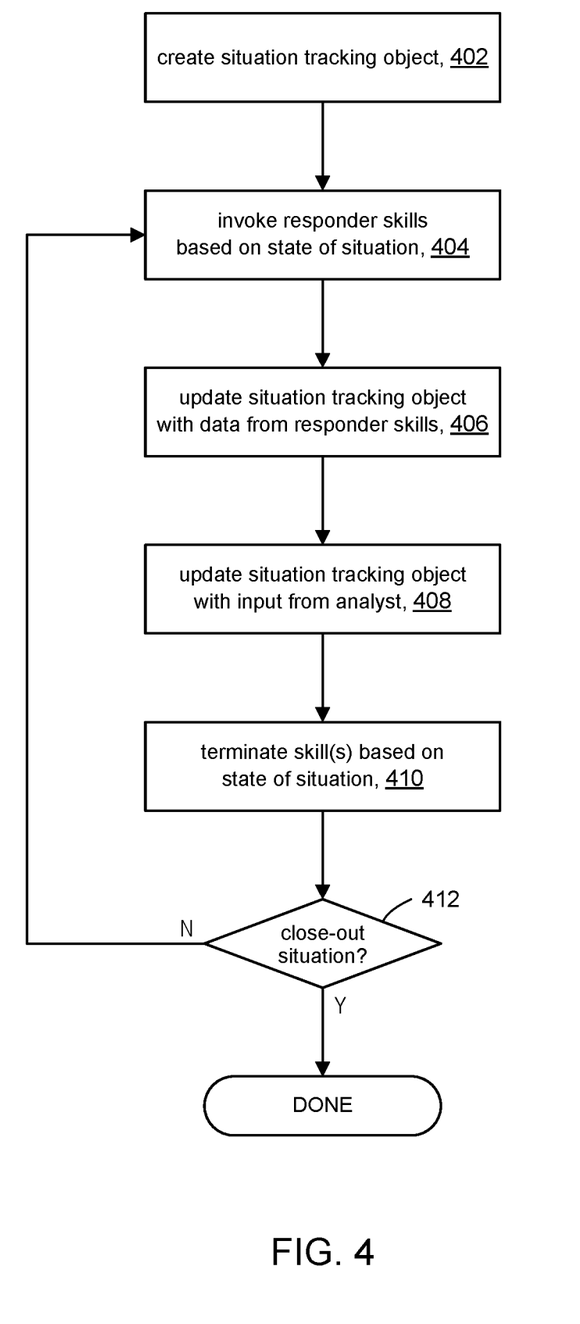
FIG. 4 is a high level flow showing operations in an automation framework in accordance with some embodiments of the present disclosure.

Referring to FIG. 4 and other figures, the discussion will now turn to a high level description of operations in automation framework 200 to manage a threat in network 100 in accordance with the present disclosure. In some embodiments, automation framework 200 can include computer executable program code, which when executed by a processor (e.g., 702, FIG. 7), can cause the processor to perform processing, in accordance with FIG. 4, by the components comprising automation framework 200.

At operation 402, the automation framework can instantiate a Situation. In some embodiments, for example, situation engine 200 can create a situation tracking object to instantiate a Situation. In accordance with some embodiments, a background (automated) monitoring process such as activity monitor 204 can trigger the situation engine to instantiate a Situation in response to detecting a threat in network 100, whether actual or potential. A user can also manually trigger a Situation, for example, via a suitable user interface.

In some embodiments, the situation engine can initialize the situation tracking object (e.g., FIG. 3) with one or more artifacts specified by the initiator of the Situation (e.g., activity monitor 204, a user, etc.). The situation engine can initialize the situation tracking object by adding each received artifact, and any associated metadata, as a separate entry 306 (FIG. 3) to the situation tracking object. For example, if activity monitor 204 detects traffic from a suspected phishing source, the activity monitor can trigger the situation engine to create a new situation instance and communicate to the situation engine one or more artifacts that it detected; for example:

object artifact (artifact 302)—the IP address of the phishing source role (304a)—PHISHING SOURCE confidence (304b)—this can be computed by the activity monitor reason (304c)—this can be provided by the activity monitor creator (304d)—this can be a suitable identifier of the activity monitor In response, the situation engine can create a new situation tracking object and insert each artifact received from the activity monitory as an entry into the newly created situation tracking object, thus instantiating a new Situation.

At operation 404, the automation framework can invoke one or more responder skills 224 to identify additional information relevant to the artifacts or entities in the Situation. In some embodiments, the purpose of the activity monitor and the purpose of responder skills can be different. In some embodiments, for example, the role of the activity monitor can be to detect activity in the network that should be monitored via a Situation. This allows the activity monitor to use broad detection criteria to encompass a wide range of activity in order to catch suspected potential threats in addition to looking for known actual threats. The role of responder skills, on the other hand, can be to monitor the network for more specific targeted activity once a suspected threat has been detected in order to make a more accurate assessment of that threat. Because some information can be too expensive to continuously monitor and calculate, responder skills can also look at historical data collected by the system to determine whether a related event has occurred for an artifact that is in the Situation.

Accordingly, in some embodiments, the situation engine can determine which responder skills to invoke based on the artifacts and their metadata stored in the situation tracking object. For example, responder skills can be selected based on the specific roles associated with the artifacts in the situation tracking object. Merely to illustrate how a responder skill might be selected, for example, available responder skills can be listed in a table. Each responder skill can be associated with one or more selection criteria. A responder skill may be associated with the criterion "ROLE=PHISHING SOURCE". When an artifact in the situation tracking object has an IP address (object artifact) that has the role of PHISHING SOURCE, the situation engine can invoke that responder skill to specifically monitor packets from that IP address. Having identified the IP address as potentially being related to phishing, the invoked responder skill can also retrieve prior activity recorded for the identified IP address to analyze for phishing-like behavior that may not have been previously identified.

At operation 406, the automation framework can update the situation tracking object with information collected from the invoked responder skills. In some embodiments, for example, responder skills can write to their corresponding situation tracking object. For instance, a responder skill may detect additional IP addresses that are relevant to the Situation; e.g., the IP addresses of the devices of recipients of a phishing attack. The additional IP addresses can be added to the Situation by creating new entries in the situation tracking object for each IP address. More generally, responder skills can be configured to identify/detect new artifacts that the situation engine can add to the situation tracking object; this is referred to as "expanding" the Situation. Responder skills can also collect information to further enhance existing artifacts recorded in the situation tracking object; this is referred to as "enriching" the Situation. For example, responder skills may alter the roles of artifacts in the situation tracking object, or add or delete roles associated with artifacts in the situation tracking object.

Because responder skills are invoked based on the information already collected for a Situation, the invoked responder skills are more likely to collect data that is relevant to the current state of the Situation and thus more likely to succeed in developing a Situation that more accurately tracks the threat than generic traffic monitoring approaches. For example, the automation framework can optimize resource utilization and discover more relevant information at a significantly lower system resource demand (and thus cost to the customer).

Responder skills can be program modules that execute as independent processes in the computing environment of automation framework 200. Merely to illustrate, for example, a responder skill can monitor an IP address (object artifact) to update its role, reason, and confidence metadata. Another responder skill can add usernames to devices that were identified as communicating with a suspect destination, for example, using the Relationship metadata. A responder skill that was developed to perform a specific function for a particular Situation might have utility beyond the specific Situation for which it was designed. That skill can be added to the set of responder skills 204, thus expanding the repertoire of data collection functions that situation engine 202 can access. While there are responder skills that are intended to uncover specific kinds of threats, we can structure the responder processing as generically as possible so that the responder skills are likely to update situations with useful relevant information regardless of whether the exact threat has been seen previously.

Merely to illustrate, responder skills can provide the following data collection functions:

Identify other external Targets that were first visited by a Device close in time to that of an originating event. For example, find external domain or IP addresses that were first seen in temporal proximity with a suspected malicious event such as a download.

Identify other devices used by a potentially compromised user.

Identify malicious communication between a suspected compromised device and other devices in the network Identify the amount of data sent to or received from a malicious site.

Perform analysis of arbitrary external Targets using an expert system focused on differentiating security threats from uninteresting Targets.

In some embodiments, skills can access security knowledge graph (SKG) 210 to identify relations to other artifacts in the network, for example, to look for commonalities between devices recorded in the situation tracking object with other devices in the network. Skills can use the SKG for a suspicious domain to determine all devices which visited that domain, as they are attributes of that domain's entry in the SKG. Skills can identify Users associated with a particular Device (which would be attributes of the Device's node in the SKG) at a time where it was believed a threat occurred. The SKG artifact for a domain records the IP addresses the devices that have communicated with that domain. Skills can use this information to expand the situation with additional devices that might be involved due to the common use of a malicious domain. Skills can look at the first-seen information recorded in the SKG for an entity or artifact and to determine whether it might have been observed as a result of malicious activity that has already been identified around that time. Skills can look at other relationships that might tie entities together such as a common domain registrar, TLS certificate organization, etc.

At operation 408, the automation framework can update the situation tracking object with information manually entered by a user, such as a threat analyst. In some embodiments, for example, the situation engine can include a UI or a web interface that allows users to interact with instantiated Situations. Manual interaction can serve to enhance the efficacy of the automated data monitoring process. Manual interaction allows the user to monitor the progress of the automated monitoring and assess a threat during its evolution. The user can make course corrections as the Situation evolves to provide feedback into the process to ensure the automation does not run open loop. The user can review the data collected in the situation tracking object (the data state of the Situation) and make adjustments by adding artifacts, modifying artifacts (e.g., their Roles metadata, Relationship metadata, etc.), and so on. The user can invoke or terminate responder skills as well.

At operation 410, the automation framework can terminate previously invoked responder skills. In some embodiments, for example, the situation engine can terminate invoked responder skills as the state of the Situation changes. For example, if a skill had been invoked because an artifact was associated with a specific role, and the role of that artifact subsequently changed, the invoked skill may no longer be relevant and accordingly may be terminated. In some embodiments, a responder skill may be associated with termination criteria which, when met, will cause the situation engine to terminate that skill, or the skill can self-terminate. The criteria can be based on one or more artifacts in the situation tracking object, their associated metadata, combinations of artifacts and metadata, and so on. In other embodiments, skills can self-terminate. For example, a skill can terminate based on the data state of the situation tracking object, after a period of time, and so on.

At decision point 412, if the Situation is closed out, then processing of the Situation can be deemed complete. For example, the Situation can be deemed to be resolved and the situation can close out the Situation; e.g., the situation tracking object can be archived. The Situation can be explicitly closed out by the user. If the situation engine does not receive any communication from its invoked responder skills or from a user for a period of time, the situation can be closed out due to the inactivity. If the Situation is not closed out, the automation framework can continue processing according to operation 404.

With each pass through operations 404-410, the situation tracking object can evolve based on information collected at operations 406 and 408. Each time operation 404 is performed additional responder skills may be invoked to collect additional data based on the current data state of the Situation. Likewise, invoked responder skills may be terminated at operation 410 based on the state of the Situation. As such, the data that accumulates for the Situation can remain relevant even as the threat landscape continues to evolve because new skills can be invoked to collect new kinds of data as the Situation changes, and old skills can be terminated to avoid collecting information that may no-longer be relevant. Moreover, because the situation engine automatically adjusts the invoked skills based on the situation tracking object, the automation reduces the user's effort in monitoring the Situation.

Activity Monitor

Figure 5:
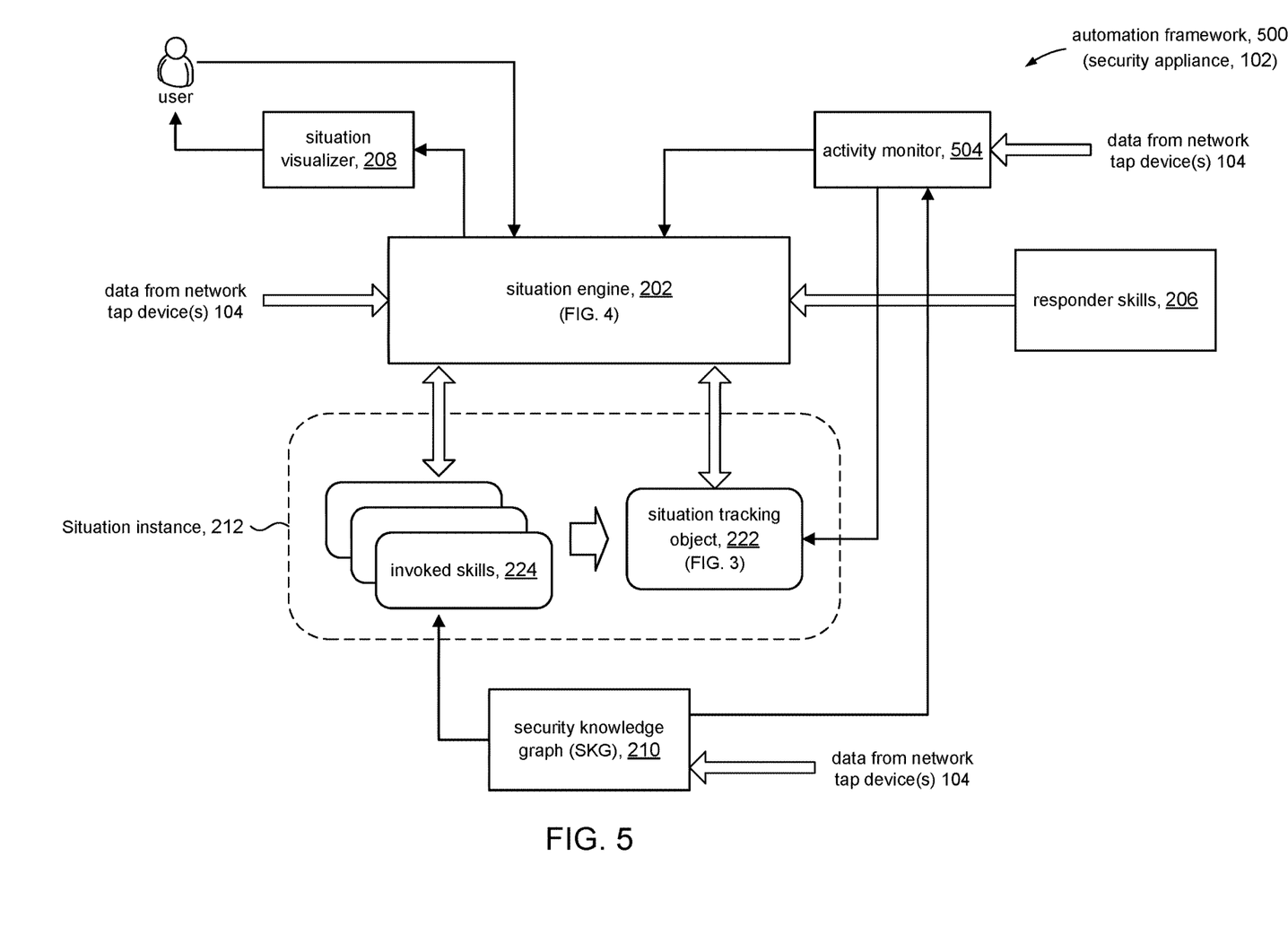
FIG. 5 is a high level block diagram of an automation framework in accordance with some embodiments of the present disclosure.

FIG. 5 illustrates an automation framework in accordance with another embodiment. As described above, activity monitor 204 can be configured to monitor network 100 to detect threats and, in response, to invoke instantiation of a Situation to monitor the threat. In some embodiments, the activity monitor can also provide telemetry to enrich and/or expand existing Situations. Referring to FIG. 5, automation framework 500 in accordance with some embodiments includes activity monitor 504 configured to invoke Situations as described above, and also to provide telemetry to existing Situations.

Figure 6:
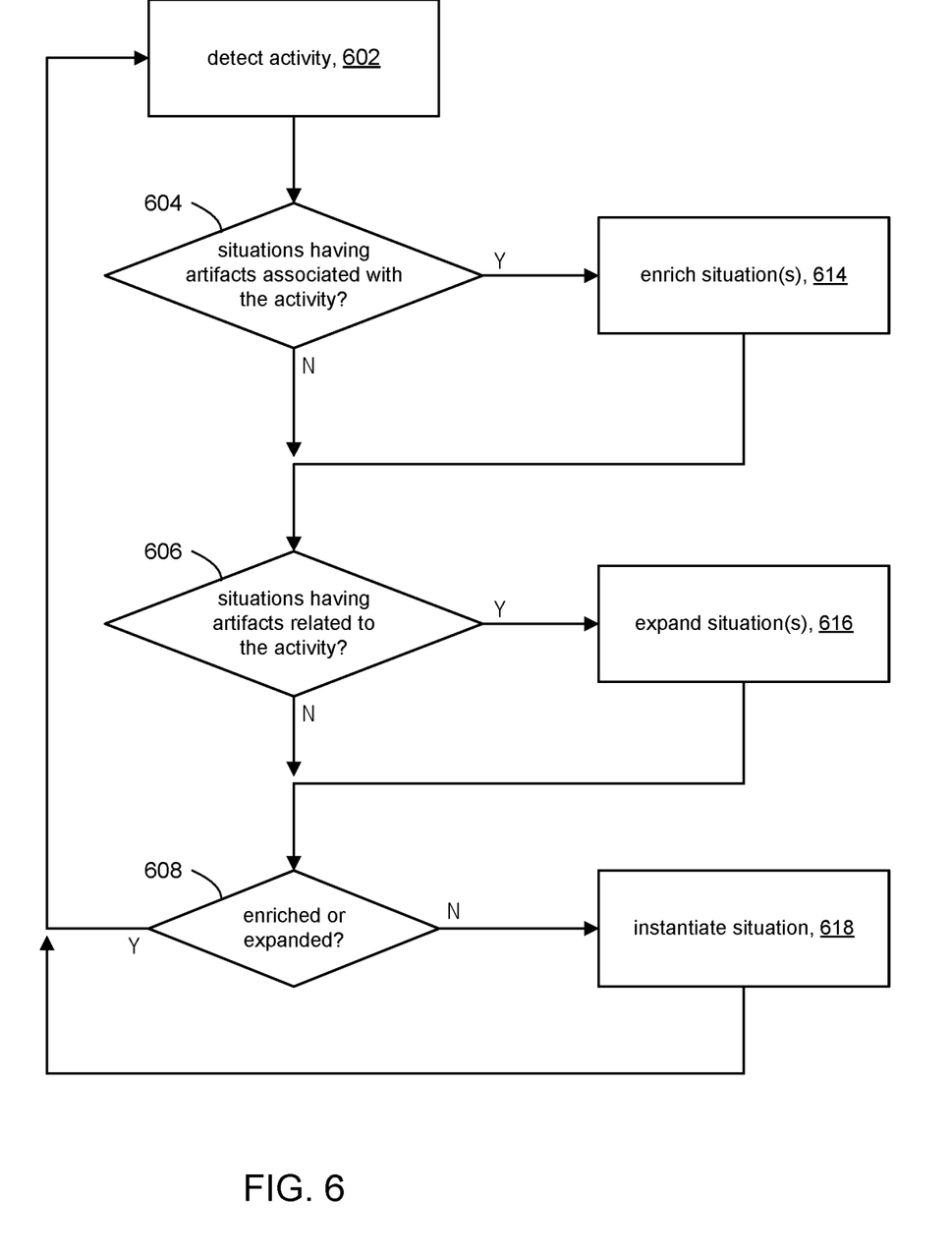
FIG. 6 is a high level flow showing operations in an activity monitor in accordance with some embodiments of the present disclosure.

Referring to FIG. 6 and other figures, the discussion will now turn to a high level description of operations in activity monitor 504 in accordance with the present disclosure. In some embodiments, activity monitor 504 can include computer executable program code, which when executed by a processor (e.g., 702, FIG. 7), can cause the processor to perform processing in accordance with FIG. 6.

At operation 602, the activity monitor can detect activity in the network that is associated with an existing threat or represents a new threat.

At decision point 604, if there are any instantiated situations containing artifacts that are directly associated with the detected activity, then the activity monitor can proceed to operation 614 to enrich each such situation by modifying one or more existing entries in the respective situation tracking object based on the detected activity. For example, if a device was found to be downloading additional information from a domain that already exists within one or more Situations, the relationship between that device and domain can be enriched with additional information such as the amount of data that has been downloaded. As another example, if a user is observed for the first time for a device, the user can be added to the Situation and linked to the device with an associated data relationship.

At decision point 606, if there are any instantiated situations containing artifacts that are related to the detected activity, then the activity monitor can proceed to operation 616 to expand each such situation by adding one or more new entries to the respective situation tracking object based on the detected activity. In some embodiments, for example, the activity monitor can access the security knowledge graph to determine if the detected activity relates to any existing artifacts in an instantiated Situation. For example, if a suspected malicious domain that exists within one or more Situations has been communicated with by one or more new devices, the aforementioned Situations would be expanded to include the newly-implicated devices, an action artifact will be added for the communication between the new device and the malicious domain, and an action participant relationship will be created between the device and the domain.

At decision point 608, if the detected activity was used to either enrich or expand an instantiated Situation, then there would be no need to instantiate a new Situation to monitor the activity because the detected activity was deemed to be associated with an on-going threat and processing can return to operation 602 to continue monitoring for more activity. If the detected activity was not used to enrich or expand an instantiated Situation, then the activity can be deemed to represent a new threat that calls for a new Situation to monitor the new threat. Accordingly, processing can proceed to operation 618 to instantiate a Situation to monitor the new activity. Processing can return to operation 602 to monitor for further activity.

Figure 7:
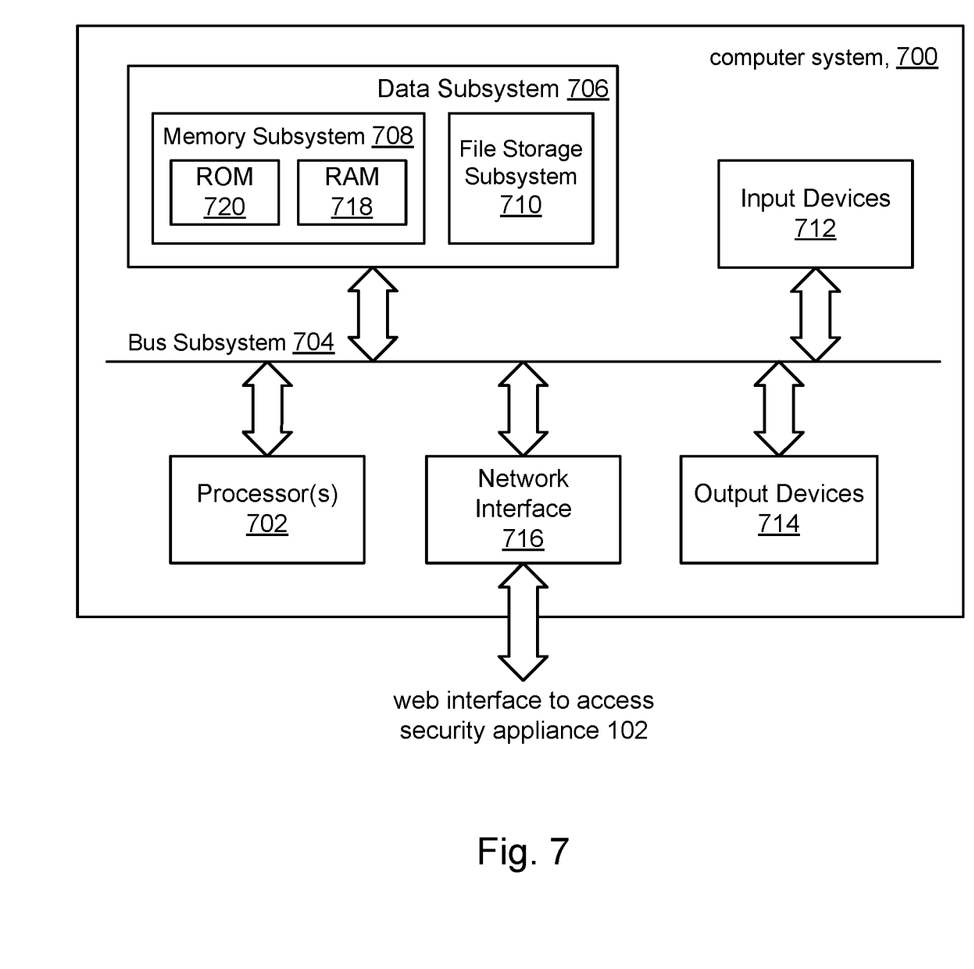
FIG. 7 shows an illustrative computing system adapted in accordance with the present disclosure.

FIG. 7 depicts a simplified block diagram of an example computer system 700 according to certain embodiments. Computer system 700 can be used to implement security appliance 102 described in the present disclosure. As shown in FIG. 7, computer system 700 includes one or more processors 702 that communicate with a number of peripheral devices via bus subsystem 704. These peripheral devices include data subsystem 706 (comprising memory subsystem 708 and file storage subsystem 710), user interface input devices 712, user interface output devices 714, and network interface subsystem 716.

Bus subsystem 704 can provide a mechanism that enables the various components and subsystems of computer system 700 to communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700, for example to deploy, troubleshoot, and perform maintenance on the computer system.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700, for example to deploy, troubleshoot, and perform maintenance on the computer system.

In some embodiments, the input and output devices can also give the user access to security appliance 102. In other embodiments, security appliance 102 can execute a web application (not shown) that is served over the network interface to provide a web interface for users to access the security appliance.

Data subsystem 706 includes memory subsystem 708 and file/disk storage subsystem 710 represent non-transitory computer-readable storage media that can store program code and/or data, which when executed by processor 702, can cause processor 702 to perform operations in accordance with embodiments of the present disclosure.

Memory subsystem 708 includes a number of memories including main random access memory (RAM) 718 for storage of instructions and data during program execution and read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

Further Examples

In accordance with the present disclosure, a method for monitoring a threat in a network includes instantiating a tracking data object to represent a threat state of the threat and to track the threat state of the threat, the tracking data object comprising one or more artifacts; determining one or more first data monitoring processes based on an initial threat state of the threat; invoking the one or more first data monitoring processes to detect events in the network and to monitor network traffic in the network including network traffic associated with the one or more artifacts; updating the threat state of the threat by storing data collected by the one or more data monitoring processes that are associated with the threat into the tracking data object; and determining and invoking additional data monitoring processes based on updates to the threat state of the threat.

In accordance with some embodiments, instantiating the tracking data object includes receiving information associated with the threat and storing the received information into the tracking data object, wherein the initial threat state of the threat comprises the stored information. Further in accordance with some embodiments, the method includes receiving the information associated with the threat from a user.

In accordance with some embodiments, updating the threat state of the threat further includes one or more of the data monitoring processes adding artifacts to the tracking data object or removing artifacts from the tracking data object.

In accordance with some embodiments, updating the threat state of the threat further includes receiving input from a human user.

In accordance with some embodiments, the method further includes terminating previously invoked data monitoring processes based on updates to the threat state of the threat.

In accordance with some embodiments, the method further includes maintaining a knowledge graph representative of nodes comprising the network, attributes of the nodes, and relationships among the nodes; and using the node attributes and relationships among the nodes to identify which data collected by the one or more data monitoring processes are associated with the threat. In accordance with some embodiments, the method further includes updating the knowledge graph based on data collected by the one or more data monitoring processes.

In accordance with the present disclosure, device in a network comprises one or more computer processors; and a computer-readable storage medium comprising instructions for controlling the one or more computer processors to: (a) detect activity that represents a threat; (b) invoke a set of monitor processes based on a current threat state of the threat to monitor activity in the network; (c) update the threat state of the threat based on activity detected by the set of invoked monitor processes; (d) change the set of invoked monitor processes based on the updated threat state of the threat; and (e) repeat (c) and (d).

In accordance with some embodiments, changing the set of invoked monitor processes occurs absent input from a user.

In accordance with some embodiments, the threat state of the threat is represented by a tracking data object, wherein the current threat state of the threat is represented by a current data state of the tracking data object. Further in accordance with some embodiments, updating the threat state of the threat includes updating the tracking data object with data collected by the set of invoked monitor processes.

In accordance with some embodiments, wherein the threat state of the threat is represented by a tracking data object representing network objects and actions related to the threat, wherein the network objects and actions are associated with roles that represent their involvement in the threat, wherein the set of monitor processes are invoked based at least on the roles of the network objects and actions. Further in accordance with some embodiments, changing the set of invoked monitor processes is based at least on the roles of the network objects and actions.

In accordance with some embodiments, changing the set of invoked monitor processes includes one or more of terminating execution of a monitor process in the set of invoked monitor processes and invoking one or more additional monitor processes.

In accordance with some embodiments, changing the set of invoked monitor processes includes receiving input from a user to either (1) terminate execution of a monitor process in the set of invoked monitor processes or (2) invoke an additional monitor process.

In accordance with the present disclosure, a method includes detecting activity that represents a threat; and tracking the threat absent input from the user, including: (a) invoking a set of monitor processes based on a current threat state of the threat to monitor activity in the network; (b) updating the threat state of the threat based on activity detected by the one or more monitor processes; (c) changing the set of invoked monitor processes based on the updated threat state of the threat; and (d) repeating (b) and (c).

In accordance with some embodiments, the threat state of the threat is represented by a tracking data object, wherein the current threat state of the threat is represented by a current data state of the tracking data object. Further in accordance with some embodiments, updating the threat state of the threat includes updating the tracking data object with data collected by the set of invoked monitor processes.

In accordance with some embodiments, changing the set of invoked monitor processes includes (1) terminating execution of a monitor process in the set of invoked monitor processes and/or (2) invoking an additional monitor process.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for monitoring a threat in a network, the method comprising:
    instantiating a tracking data object to represent and track the threat, wherein the tracking data object comprises one or more artifacts corresponding to a threat state of the threat, and wherein each of the one or more artifacts includes artifact metadata specifying an object or action associated with the threat state and a role assigned to the object or action with respect to the threat state;
    selecting, from among a plurality of data monitoring processes, one or more first data monitoring processes based on the one or more artifacts in the tracking data object, wherein the selecting comprises matching selection criteria defined for the one or more first data monitoring processes with the artifact metadata included in the one or more artifacts;
    invoking the one or more first data monitoring processes to detect events in the network and to monitor network traffic in the network including network traffic associated with the one or more artifacts;
    updating the threat state of the threat in accordance with data collected by the one or more first data monitoring processes; and
    selecting and invoking additional data monitoring processes based on updates to the threat state of the threat.

2. The method of claim 1, wherein the one or more artifacts are received from an activity monitor that detected the threat.

3. The method of claim 1, wherein the one or more artifacts are received from a human user.

4. The method of claim 1, wherein updating the threat state of the threat comprises modifying the one or more artifacts or adding new artifacts to the tracking data object based on the data collected by the one or more first data monitoring processes.

5. The method of claim 1, wherein updating the threat state of the threat further includes receiving input from a human user.

6. The method of claim 1, further comprising terminating previously invoked data monitoring processes based on updates to the threat state of the threat.

7. The method of claim 1, further comprising maintaining a knowledge graph representative of nodes comprising the network, attributes of the nodes, and relationships among the nodes; and using the node attributes and relationships among the nodes to identify which data collected by the one or more first data monitoring processes are associated with the threat.

8. The method of claim 7, further comprising updating the knowledge graph based on data collected by the one or more first data monitoring processes.

9. The method of claim 1, wherein the artifact metadata included in each of the one or more artifacts further specifies:
    a confidence score indicating a likelihood that the role assigned to the object or action is correct; and
    a text field specifying a reason why the role was assigned.

10. The method of claim 1, wherein the artifact metadata included in at least one artifact of the one or more artifacts further specifies a relationship between said at least one artifact and another artifact.

11. The method of claim 10, wherein said at least one artifact pertains to a first object associated with the threat state, said another artifact pertains to a first action associated with the threat state, and wherein the relationship indicates that the first object is an initiator or target of the first action.

12. A device in a network comprising:
    one or more computer processors; and
    a computer-readable storage medium comprising instructions for controlling the one or more computer processors to:
        (a) detect activity that represents a threat;
        (b) instantiate a tracking data object for the threat, wherein the tracking data object comprising one or more artifacts corresponding to a threat state of the threat, and wherein each of the one or more artifacts includes artifact metadata specifying an object or action associated with the threat state and a role assigned to the object or action with respect to the threat state;
        (c) select, from among a plurality of monitor processes, a set of monitor processes based the one or more artifacts in the tracking data object, wherein the selecting comprises matching selection criteria defined for the set of monitor processes to the artifact metadata included in the one or more artifacts;
        (d) invoke the set of monitor processes and update the threat state of the threat based on activity detected by the set of monitor processes;
        (e) change the set of monitor processes based on the updated threat state of the threat; and
        (f) repeat (d) and (e).

13. The network device of claim 12, wherein changing the set of monitor processes occurs absent input from a user.

14. The network device of claim 9, wherein updating the threat state of the threat includes updating the tracking data object with data collected by the set of monitor processes.

15. The network device of claim 12, wherein updating the tracking data object comprises modifying the one or more artifacts or adding new artifacts to the tracking data object based on the data collected by the set of monitor processes.

16. The network device of claim 12, wherein changing the set of monitor processes includes one or more of terminating execution of a monitor process in the set of monitor processes and invoking one or more additional monitor processes.

17. The network device of claim 12, wherein changing the set of invoked monitor processes includes receiving input from a user to either (1) terminate execution of a monitor process in the set of monitor processes or (2) invoke an additional monitor process.

18. A method comprising:

detecting activity that represents a threat; and tracking the threat absent input from the user, including:
- (a) selecting, from among a plurality of monitor processes, a set of monitor processes based on one or more artifacts maintained in a tracking data object for the threat, wherein the one or more artifacts correspond to a threat state of the threat, wherein each of the one or more artifacts includes artifact metadata specifying an object or action associated with the threat state and a role assigned to the object or action with respect to the threat state, and wherein the selecting comprises matching selection criteria defined for the one or more first data monitoring processes to the artifact metadata included in the one or more artifacts;
- (b) invoking the set of monitor processes and updating the threat state of the threat based on activity detected by the set of monitor processes;
- (c) changing the set of monitor processes in response to the updating; and
- (d) repeating (b) and (c).

19. The method of claim 18, wherein updating the threat state of the threat includes updating the tracking data object with data collected by the set of monitor processes.

20. The method of claim 18, wherein changing the set of monitor processes includes (1) terminating execution of a monitor process in the set of monitor processes and/or (2) invoking an additional monitor process.

* * * * *